(12) United States Patent
Rubio Moreno et al.

(10) Patent No.: US 12,111,252 B2
(45) Date of Patent: Oct. 8, 2024

(54) METHOD FOR SORTING FLEXIBLE POLYURETHANE FOAMS

(71) Applicant: REPSOL, S.A., Madrid (ES)

(72) Inventors: Miguel Rubio Moreno, Móstoles (ES); Francisco Javier Carvajal González, Móstoles (ES); Sonia Segura Fernández, Móstoles (ES); Enrique Domínguez Ramos, Móstoles (ES)

(73) Assignee: REPSOL, S.A., Madrid (ES)

( * ) Notice: Subject to any disclaimer, the term of this patent is extended or adjusted under 35 U.S.C. 154(b) by 0 days.

(21) Appl. No.: 18/569,746

(22) PCT Filed: Jun. 17, 2022

(86) PCT No.: PCT/EP2022/066621
§ 371 (c)(1),
(2) Date: Dec. 13, 2023

(87) PCT Pub. No.: WO2022/263664
PCT Pub. Date: Dec. 22, 2022

(65) Prior Publication Data
US 2024/0264078 A1   Aug. 8, 2024

(30) Foreign Application Priority Data
Jun. 18, 2021   (EP) .................................... 21382541

(51) Int. Cl.
*G01N 21/3563*   (2014.01)
*B07C 5/342*   (2006.01)
(Continued)

(52) U.S. Cl.
CPC ......... *G01N 21/3563* (2013.01); *B07C 5/342* (2013.01); *B29B 17/02* (2013.01);
(Continued)

(58) Field of Classification Search
CPC ................................................. G01N 21/3563
See application file for complete search history.

(56) References Cited

U.S. PATENT DOCUMENTS

| 2023/0194424 A1* | 6/2023 | Niemöller | G01J 3/28 |
| | | | 250/339.09 |
| 2023/0264391 A1* | 8/2023 | Froebel | B07C 5/342 |
| | | | 209/580 |

FOREIGN PATENT DOCUMENTS

CN   110376157 A   10/2019

OTHER PUBLICATIONS

Decision to Grant a European Patent for European Patent Application No. 21382541.7 (now EP Patent No. 4104994), dated Jul. 13, 2023, 2 pages.

(Continued)

*Primary Examiner* — David P Porta
*Assistant Examiner* — Casey Bryant
(74) *Attorney, Agent, or Firm* — Pearne & Gordon LLP

(57) ABSTRACT

A method for sorting flexible polyurethane foams including: a) providing two or more calibration samples of conventional flexible polyurethane foams, two or more calibration samples of high resilience (HR) flexible polyurethane foams, and two or more calibration samples of viscoelastic flexible polyurethane foams, and obtaining a mid-infrared (MIR) spectrum of each calibration sample; b) carrying out a spectral pre-processing of the spectra of all the calibration samples and, then a first PCA to define a first library; c) carrying out a spectral pre-processing of the infrared spectra of conventional and HR calibration samples and, then a second PCA to define a second library; d) obtaining the MIR spectrum of a sample of polyurethane foam and, based on the first and second libraries, classifying the sample of polyurethane foam as a conventional, HR or viscoelastic (Continued)

polyurethane foam, or as a foam that is neither a conventional, a HR or a viscoelastic polyurethane foam.

20 Claims, 3 Drawing Sheets

(51) Int. Cl.
    *B29B 17/02*     (2006.01)
    *B29K 75/00*     (2006.01)
    *B29K 105/04*     (2006.01)
    *B29K 105/06*     (2006.01)

(52) U.S. Cl.
    CPC ............... *B29B 2017/0203* (2013.01); *B29B 2017/0279* (2013.01); *B29K 2075/00* (2013.01); *B29K 2105/04* (2013.01); *B29K 2105/065* (2013.01); *G01N 2201/127* (2013.01); *G01N 2201/129* (2013.01)

(56) References Cited

OTHER PUBLICATIONS

Miller, Charles et al. "Analysis of Rigid Polyurethane Foams by Near-Infrared Diffuse Reflectance Spectroscopy", Applied Spectroscopy, US, vol. 44, No. 5, (1990) pp. 887-894; https://journals.sagepub.com/doi/10.1366/0003702904087064.

Mitchell, Gemma et al., "Assessment of historical polymers using attenuated total reflectance-Fourier transform infra-red spectroscopy with principal component analysis", Heritage Science, (2013), 1:28; doi: 10.1186/2050-7445-1-28.

OPUS Spectroscopic Software Version 7.5 from Bruker Optik GmbH 2014—Reference Manual.

European Search Report of European Application No. EP21382541, dated Nov. 13, 2021, 6 pages.

International Search Report and Written Opinion of International Application No. PCT/EP2022/066621, dated Jul. 25, 2022, 16 pages.

* cited by examiner

METHOD FOR SORTING FLEXIBLE POLYURETHANE FOAMS

CROSS-REFERENCE TO RELATED APPLICATIONS

This is a National Stage application of PCT International Application PCT/EP2022/066621, filed on Jun. 17, 2022, which claims the benefit of European Patent Application EP21382541.7 filed on Jun. 18, 2021, both of which are incorporated herein by reference in their entirety.

TECHNICAL FIELD

This invention relates to the field of waste and in particular of polyurethane foams such as these from old mattresses. More particularly, it relates to a method for the sorting of flexible polyurethane foams in order to recover those that are chemically recyclable.

BACKGROUND ART

One problem with mechanical recycling of post-consumer flexible polyurethane foam such as from old mattresses is that second-life applications are generally low-value. Hence, there is an increasing interest in chemical recycling of polyurethane foams, which offers the possibility of recovering raw materials such as polyols. Nevertheless, there is as well an inherent difficulty on this due to the great variation in age and composition of materials coming from discarded mattresses.

Therefore, in order to obtain high-value recycled products such as polyols by chemical recycling, the analysis, sorting and separation of different kinds of polyurethane foams, which usually are of unknown and inhomogeneous compositions, must be carried out.

Polyurethane foams from mattresses are usually of three types, which are known as: HR foams, conventional foams, or viscoelastic foams. These three types of polyurethane foams are differentiated by the molecular weight of the polyols used for their preparation, which is within the range of 5000-12000 for High Resilience (HR) foams, within the range of 3000 to 3500 for conventional foams, and of a much lower molecular weight for viscoelastic foams.

Usually, first a manual process in which mattresses are opened and their different components are separated by type (fabrics, foams, springs and other elements) is performed. Unfortunately, molecular weight determination techniques such as GPC has strong limitations due to the poor solubility of these materials and, in addition, often require long analysis times of the order of few hours. Hence, the polyurethane foams are subjected to a visual inspection, discarding the coloured ones that would transmit that colour to the recycled polyol, and only those of white or yellow colour are destined to chemical recycling.

Thus, there continues to be a need of better processes for the sorting of polyurethane foams, particularly, of flexible polyurethane foams from mattresses, and which allows quickly differentiate the segregated foams in-situ.

SUMMARY OF INVENTION

Flexible foams are categorized as conventional (made of polyols of different molecular weight in the range 3000 to 3500 and toluene diisocyanate (TDI). Viscoelastic foams are made of polyols of different molecular weight in the range 700-2000 and TDI. High Resilience (HR) foams are made of polyols of different molecular weight in the range 5000-12000 and 4,4-diphenylmethane diisocyanate (MDI) and/or TDI. As mentioned above, HR, conventional, and viscoelastic foams are differentiated by the molecular weight of the polyols used for their preparation. Considering the polymer structure of polyurethane foams, the higher the molecular weight, the more ether groups with respect to the carbonyl groups in the urethane.

Thus, initially, the inventors hypothesized that it would be possible to distinguish polyurethane foams of equal composition but different molecular weights by differences in the intensity of the bands corresponding to the mentioned functional groups in the infrared spectrum, that is, the larger the ether/carbonyl ratio the higher the molecular weight of the polyurethane foams.

However, the results showed that the method produced some false negatives, i.e., polyurethane foams that allegedly were not conventional ones, but they were; and some false positives, i.e., polyurethane foams that allegedly were conventional ones, but they were not. One of the possible causes of these anomalous results could be the use of mixtures of polyols of different molecular weights in the preparation of the polyurethane foams, which give rise to somewhat average molecular weights that place them in the wrong region.

Nevertheless, surprisingly, the inventors found that by combining infrared technology (particularly, mid-infrared (MIR) spectroscopy, i.e., infrared in the 4000-400 cm$^{-1}$ region) and chemometric calibration in a specific way, it was possible to distinguish the 3 types of polyurethane foams (conventional, HR and viscoelastic) and, thus, it was possible to correctly identify and select conventional foams (which can be chemically recycled to obtain polyol). Particularly, inventors found that this could be achieved by carrying out two consecutive classifications based on PCA (Principal Component Analysis) in two specific regions of the IR spectra.

Thus, an aspect of the invention relates to a method for sorting flexible polyurethane foams comprising:
  a) providing two or more calibration samples of conventional flexible polyurethane foams, two or more calibration samples of high resilience (HR) flexible polyurethane foams, and two or more calibration samples of viscoelastic flexible polyurethane foams, and obtaining a mid-infrared (MIR) spectrum of each calibration sample, wherein the MIR is defined by a whole spectral region from 4000-400 cm$^{-1}$;
  b) carrying out a spectral pre-processing of the spectra of all the calibration samples, and then a first PCA in the spectral region from 1800 to 1425 cm$^{-1}$ to define a first library that allows distinguishing viscoelastic polyurethane foams;
  c) carrying out a spectral pre-processing of the infrared spectra of conventional and HR polyurethane foam calibration samples, and then a second PCA in the spectral regions from 1775 to 1625 cm$^{-1}$ and from 970 to 725 cm$^{-1}$ to define a second library that allows distinguishing conventional from HR polyurethane foams with one principal component;
  d) obtaining the MIR spectrum of a sample of polyurethane foam and, based on the first and second libraries, classifying the sample of polyurethane foam as a conventional, HR or viscoelastic polyurethane foams, or as a different type of foam, i.e. a foam that is neither a conventional, a HR or a viscoelastic polyurethane foam.

Advantageously, the method of the present invention is a non-destructive, quick, simple, and low-cost method that allows identifying viscoelastic, HR and conventional foams with a high degree of accuracy, with the aim of discarding viscoelastic and HR foams and selecting conventional foams which can be later chemically recycled. Thus, not only false negatives are avoided, which allows correctly identifying a greater number of conventional foams, but importantly false positives are also avoided, which allows preventing the problems derived from the wrong identification of viscoelastic and HR foams.

BRIEF DESCRIPTION OF DRAWINGS

Some non-limiting examples of the present disclosure will be described in the following with reference to the appended drawings, in which.

DETAILED DESCRIPTION OF THE INVENTION

Figure 1:
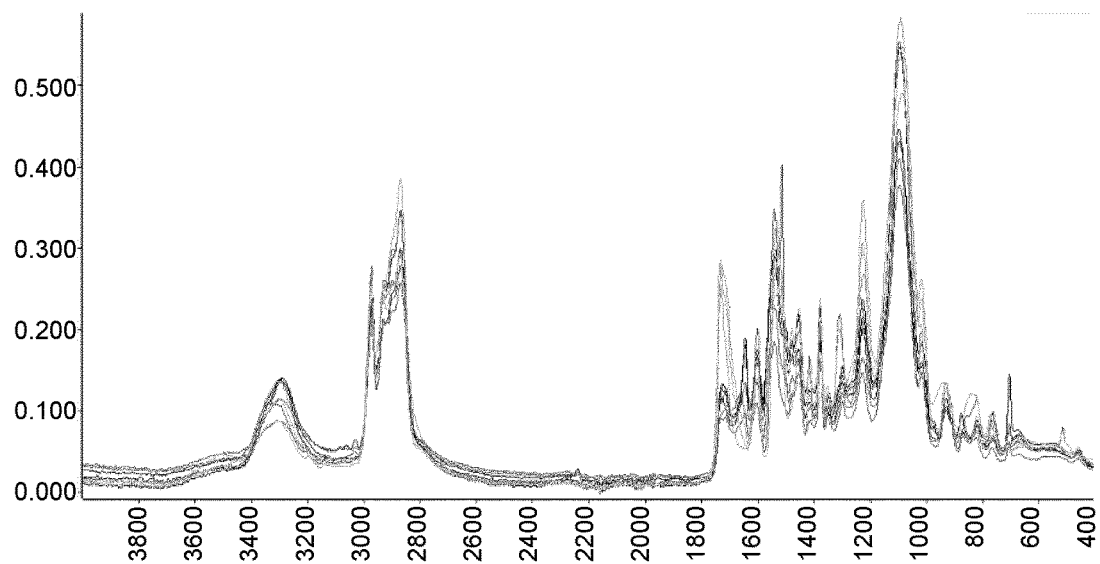
FIG. 1 shows the MIR spectra of several calibration samples of conventional, HR and viscoelastic polyurethane foams.

All terms as used herein in this application, unless otherwise stated, shall be understood in their ordinary meaning as known in the art. Other more specific definitions terms as used in the present application are as set forth below and are intended to apply uniformly throughout the specification and claims unless an otherwise expressly set out definition provides a broader definition.

Principal components analysis (PCA) is a statistical technique used for data reduction. The method applied to a single set of variables with the aim of discovering which variables in the set form coherent subsets that are relatively independent of one another. Variables that are correlated with one another but are largely independent of other sets of variables are combined into principal components. These principal components allow condensing the number of variables in the analysis by combining several variables into one principal component. Thus, the PCA allows simplifying a dataset with a great number of variables, "n" (in a space with "n" dimensions), to a much smaller dataset with few "f" variables (typically between 1 and 10), also called principal components (in a virtual space of "f" dimensions). The "f" variables can be represented in a so-called "scores diagram", that allows to see the distribution of the samples in a "virtual" space resulting from reducing the hundreds of real variables contained in each IR spectrum to a few "virtual" variables (normally between 1 and 10, but representing the first two—PC1 and PC2—which in practice usually contain the maximum amount of information). Each axis of the graphs is a principal component (PC1 and PC2) resulting from doing the PCA or principal component analysis.

The term "calibration samples", as used herein, relate to samples of flexible polyurethane foams which have been synthesized from known starting materials in order to get samples of each one of the three types of polyurethane foams, that is conventional, viscoelastic, or HR, were obtained from polyols of different molecular weight and known isocyanates, particularly MDI, TDI (including 2,4- and 2,6-TDI), or a mixture thereof. Additionally, some of the samples contained some additives such tris(1-chloro-2-propyl) phosphate (TCPP; used as flame retardant), calcium carbonate (used as filler), or a mixture thereof.

The term "validation samples", as used herein, relate to post-consumer samples from mattresses of flexible polyurethane foams known to be either conventional, HR, or viscoelastic. These samples are not included in the calibration set but serve to validate the method. The term "post-consumer" means a material or finished product such as mattresses that has served its intended use and has been discarded for disposal or recovery, having completed its life as a consumer item.

The term "spectral library" or simply "library", as used herein, refers to a collection of polyurethane foams and their spectra that is used for the fast, reliable identification of polyurethane foams having a similar spectra.

It is noted that, as used in this specification and the appended claims, the singular forms "a", "an", and "the" include plural referents unless the context clearly dictates otherwise.

As mentioned above, an aspect of the invention relates to a method for sorting flexible polyurethane foams by combining MIR spectroscopy and chemometric calibration in a very specific way as defined above, in order to select conventional polyurethane foams that are susceptible for chemical recycling.

The method of the invention can be performed with using as calibration samples several types of already identified conventional, HR and viscoelastic polyurethane foams. Several samples of each kind with a different content of additives (these being the ones commonly used, for instance, in flexible polyurethane foams for mattresses or in other articles of manufacture of interest) and other components of possible interference (such as contaminants) can be used as calibration samples. As an instance, conventional foams (polyols with a molecular weight in the range 3000 to 3500 and TDI), HR foams (polyols with a molecular weight in the range 5000-6000, some with MDI and others with TDI) and viscoelastic foams (polyols with a molecular weight in the range 700-2000, and TDI) were used. Additionally, at least one of each type of foam with and without TCPP, and at least one of each type of foam with and without calcium carbonate can also be included in the set of calibration samples.

In the case of heterogeneous foam samples, it is recommended to carry out measurements in several points of different appearance (4-5 measurements recommended). In addition to the calibration samples, a set of validation samples (such as from 2 to 6 of each type, particularly 4 or 5 samples of each type) is used.

In an embodiment, in order to obtain the spectra of the calibration samples, the MIR spectra of from 5 to 50 flexible polyurethane foams of each type are taken. Thus, the number of calibration samples of each type of polyurethane foam is independently selected from 2 to 50, particularly, from 5 to 30, or from 5 to 20, or from 6 to 10.

MIR spectroscopy can be carried out with a conventional Fourier transform infrared (FTIR) spectrometer equipped with an ATR (attenuated total reflectance) accessory. PCA analysis of the obtained spectra can be carried out with the software already provided by the spectrometer. As an instance, MIR spectra can be obtained by an Alpha Bruker spectrometer equipped with a one-bounce horizontal diamond ATR accessory and operated with the OPUS Bruker's spectroscopic software, such as OPUS version 7.5 from Bruker Optik GmbH 2014 (see the nominal working conditions in the example below and OPUS Spectroscopic Software Reference Manual Version 7.5). Usually, the nominal working conditions are 32 scans/spectrum, resolution=4 $cm^{-1}$, working spectral range: 4000-400 $cm^{-1}$, room temperature. The term "room temperature" refers to about 20-25° C.

Other MIR spectrophotometers provided with PCA analysis software can also be used, since they will provide similar results.

All spectra (of the calibration samples) are stored in a library (such as an OPUS library), including spectra information.

Spectral pre-processing can be carried out by several methods such as vector-normalization, first derivative, or a combination thereof, which are options provided by, and therefore defined in, the OPUS software, such as in the Version 7.5 mentioned above.

In another embodiment, optionally in combination with one or more features of the embodiments defined above, spectral pre-processing in step a) is carried out by vector-normalization. Vector-normalization allows reducing the (physical) variability between samples due to scatter, source power fluctuations, variations in sample thickness, or others. The Normalization command, particularly the vector-normalization command, of the OPUS software (see OPUS Reference manual, section 8.7 Normalization) allows to normalize spectra and perform offset corrections on spectra.

In another embodiment, optionally in combination with one or more features of the particular embodiments defined above, spectral pre-processing in step b) is carried out by vector-normalization and first derivative. The first derivative allows removing the baseline and improves the detection of differences between spectra.

The Derivative command of the OPUS software (see OPUS Reference manual, section 8.11 Derivative) allows calculating the first to fifth derivative of a spectrum, using the Savitzky-Golay algorithm. Particularly, with the IDENT package which is included in OPUS software the first or the second derivative can be selected. The mentioned algorithm allows a simultaneous smoothing of the spectrum. The smoothing effect reduces the noise generated by derivation. The software allows selecting a number of smoothing points from 5 to 25. Normally, using 7-11 points, such as 9 points, for smoothing is enough for typical high-resolution spectra data. Thus, in another embodiment, the first derivative is carried out with a smoothing from 7 to 11, particularly from 7 to 9 points.

Additionally, to the abovementioned sorting process of conventional, HR and viscoelastic polyurethane foams, in order to select and chemically recycle the conventional ones, the presence of Ca, P and C in the polyurethane foams, particularly in conventional foams, can also be analyzed. This will allow discarding polyurethane foams containing additives that will contaminate the polyol resulting from recycling.

Ca is derived from calcium carbonate which is used as a filler in mattresses, and P and Cl are derived from the compound tris(1-chloro-2-propyl) phosphate (TCPP), which is used as a flame retardant. The presence of Ca can have a negative effect on the acidolysis process by possible reaction with the acid used therein, and TCPP could decompose in the acidic reaction conditions leading to unwanted degradation products. Thus, the mentioned side-products, originating from the undesired presence of calcium carbonate or TCPP, would contaminate the polyol resulting from recycling. In order to avoid this, polyurethane foams containing the mentioned additive should also be discarded for recycling.

Hence, in addition to the abovementioned steps for sorting flexible polyurethane foams, in order to determine both qualitatively and quantitatively the presence of Ca, P or Cl, spectrometric methods such as X-ray fluorescence (XRF) (such with a XRF equipment provided with an Ag anode X-ray tube, and at 50 kV and 1000 μA intensity). It is important to consider that the detection of Cl may offer false positives, since the foam may be contaminated for instance with fluids of human origin such as sweat or urine with a high presence of sodium chloride. Thus, it is preferable to determine the presence of P and, optionally, confirming that the relation of Cl/P is at least about 3.4 by weight (that is, at least three Cl atoms by every P atom, considering the possible presence of Cl coming from contaminating fluids).

Thus, in an embodiment, optionally in combination with one or more features of the embodiments defined above, the method of the present invention further comprises a step of determining the presence of P and, optionally, the presence of Cl by a spectrometric method such as X-ray fluorescence (XRF) or laser excitation emission spectrometry (LIBS). Particularly, if the amount of P is higher than 100 ppm, and if the relation of Cl/P is at least about 3.4 by weight, the polyurethane foam will be discarded for chemical recycling.

In another embodiment, optionally in combination with one or more features of the particular embodiments defined above, the method of the present invention further comprises a step of analyzing the amount of Ca by a spectrometric method such as X-ray fluorescence (XRF). Particularly, if the amount of Ca is higher than 200 ppm (corresponding to 500 ppm of $CaCO_3$), the polyurethane foam will be discarded for chemical recycling.

The process for the analyzing the amount of Ca, P, Cl, or a combination thereof, by the mentioned spectrometric methods can be carried out before or after the abovementioned sorting method in order to classify the polyurethane foam by type (i.e., viscoelastic, HR, or conventional).

In one embodiment, optionally in combination with one or more features of the particular embodiments defined above, the step of analyzing the amount of Ca, P, Cl, or a combination thereof, is carried out before the abovementioned sorting steps in order to discard polyurethane foams containing calcium carbonate, TCPP, or both of them.

In another embodiment, optionally in combination with one or more features of the particular embodiments defined above, the step of determining Ca, P or Cl is carried out after the abovementioned sorting steps and on a conventional foam, which is the only one susceptible of being chemically recycled.

Throughout the description and claims the word "comprise" and variations of the word, are not intended to exclude other technical features, additives, components, or steps. Furthermore, the word "comprise" encompasses the case of "consisting of". Furthermore, the present invention covers all possible combinations of particular and preferred embodiments described herein.

The following examples and drawings are provided by way of illustration, and they are not intended to be limiting of the present invention.

EXAMPLES

Example 1

The sorting of polyurethane foams was based on PCA classifications performed with a set of samples of known flexible polyurethane foams of the 3 types of interest (conventional, HR and viscoelastic polyurethane foams). The samples used are shown in Table 1 below.

TABLE 1

| Sample | Type of foam | Observations |
|---|---|---|
| A1 | Conventional | TDI 80/20 |
| A2 | Conventional | TDI 80/20, mixture of polyols, SAN, crosslinker |
| A3 | Conventional | TDI 80/20, TCPP |
| A4 | Conventional | TDI 80/20, CaCO$_3$ |
| A5 | Conventional | TDI 80/20, mixture of polyols, SAN, crosslinker, CaCO$_3$ |
| B1 | HR | MDI |
| B2 | HR | TDI 80/20, mixture of polyols, SAN |
| C1 | Viscoelastic | TDI 65/35 |

SAN: styrene acrylonitrile; TDI 80/20 is a mixture of 80% 2,4-TDI with 20% 2,6-TDI; TDI 65/35 is a mixture of 65% 2,4-TDI with 35% 2,6-TDI.

In particular, ten conventional polyurethane foam samples (calibration samples A1 to A5, plus five validation samples of post-consumer conventional foams), six HR samples (calibration samples 1 and B2, plus four validation samples of post-consumer HR foams) and five viscoelastic samples (calibration samples C1, plus four validation samples of post-consumer viscoelastic foams) were used. The validation samples were post-consumer samples identified as one of the typologies of interest, that is conventional, HR, or viscoelastic.

The flexible polyurethane foams above were analyzed by infrared spectroscopy. After confirming that the validation samples were correctly distributed in the areas of the PCA previously delimited with the calibration samples, they were used to enrich the calibration set to make it more robust. Thus, the obtained infrared spectra were the input data needed for the PCA classifications.

Therefore, the calibration samples covered the whole range of the 3 types of polyurethane foams with different characteristics, that is, new and post-consumer foams, additivated foams, and foams with different types of isocyanates.

Infrared spectroscopy was carried out in an Alpha Bruker spectrometer equipped with a one-bounce horizontal diamond ATR (attenuated total reflectance) accessory and operated with OPUS Bruker's software. Nominal working conditions were: 32 scans/spectrum, resolution=4 cm$^{-1}$, working spectral range: 4000-400 cm$^{-1}$, room temperature.

For the analysis, each piece of each foam was placed over the ATR crystal and pressed for spectral measurement. If the foam was heterogeneous (different colors, different textures, and so on), an infrared measurement was performed in a piece of foam representative of each different color, texture, and so on.

The PCA classifications were performed with the IDENT package which is included in OPUS Bruker's software (OPUS version 7.5 from Bruker Optik GmbH 2014). Two subsequent PCA classifications (that is, a library and a sub-library) were needed.

Figure 2:
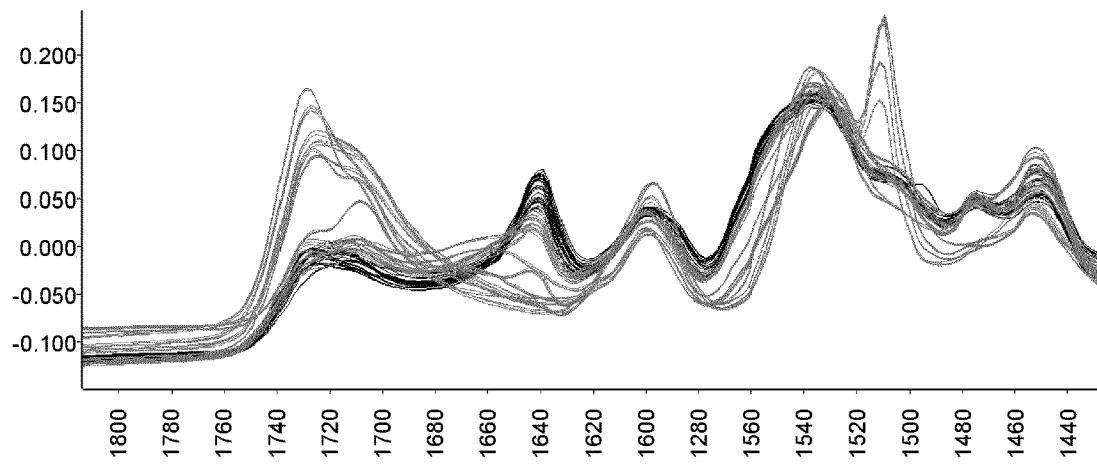
FIG. 2 shows the spectral region from 1800 to 1425 cm$^{-1}$ of the calibration sample MIR spectra.
Figure 4:
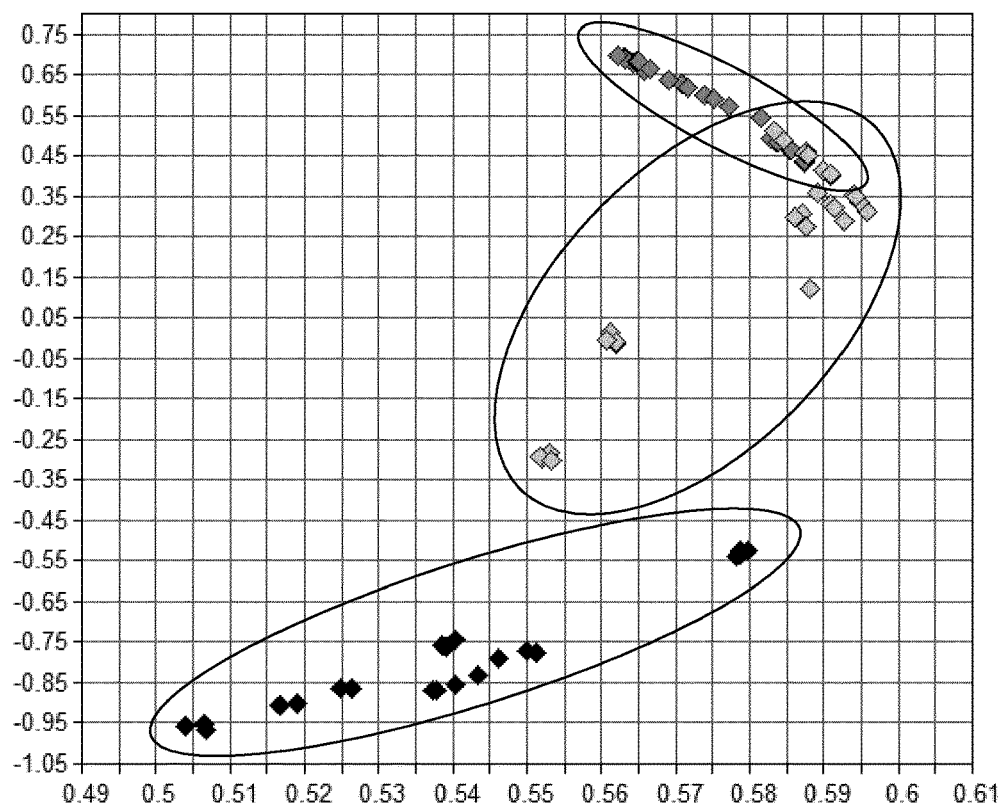
FIG. 4 shows the score diagram (score 2 vs. score 1) of the first PCA, carried out in the spectral region from 1800 to 1425 cm$^{-1}$.
Figure 5:
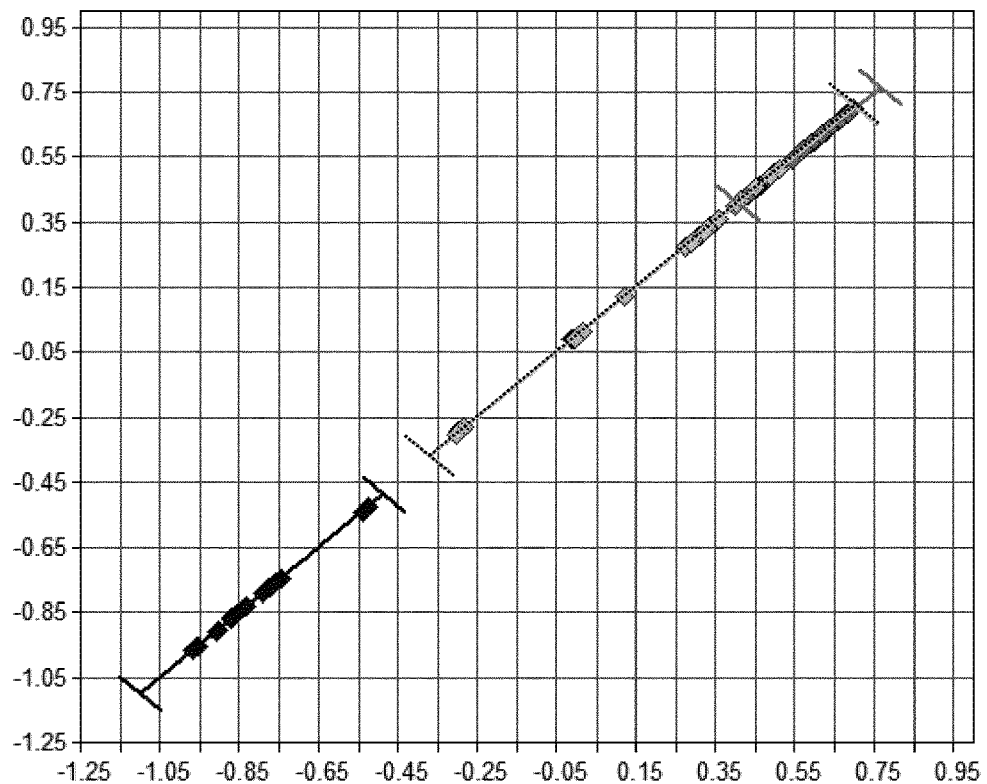
FIG. 5 shows the score diagram (score 2 vs. score 2) of the first PCA, carried out in the spectral region from 1800 to 1425 cm$^{-1}$.

With the spectra of the calibration samples (FIG. 1), a vector-normalization spectral pre-processing (in the whole spectral range) was performed and then a first PCA was carried out in the spectral region from 1800 to 1425 cm$^{-1}$ (FIG. 2) to define a first library. This allowed, with one score, to distinguish viscoelastic samples from the rest (conventional and HR samples), as can be seen in FIG. 4 and FIG. 5 (in FIG. 5 the threshold boundaries are indicated by small lines), where samples corresponding to the viscoelastic calibration samples are grouped in a distinct area clearly distinguished from the rest.

Figure 3:
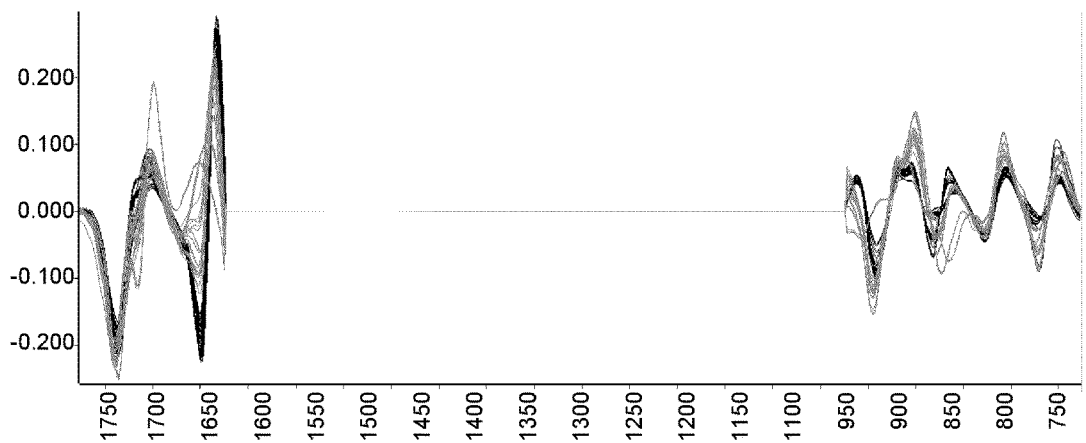
FIG. 3 shows the spectral regions from 1775 to 1625 cm$^{-1}$ and from 970 to 725 cm$^{-1}$ of the calibration sample MIR spectra.
Figure 6:
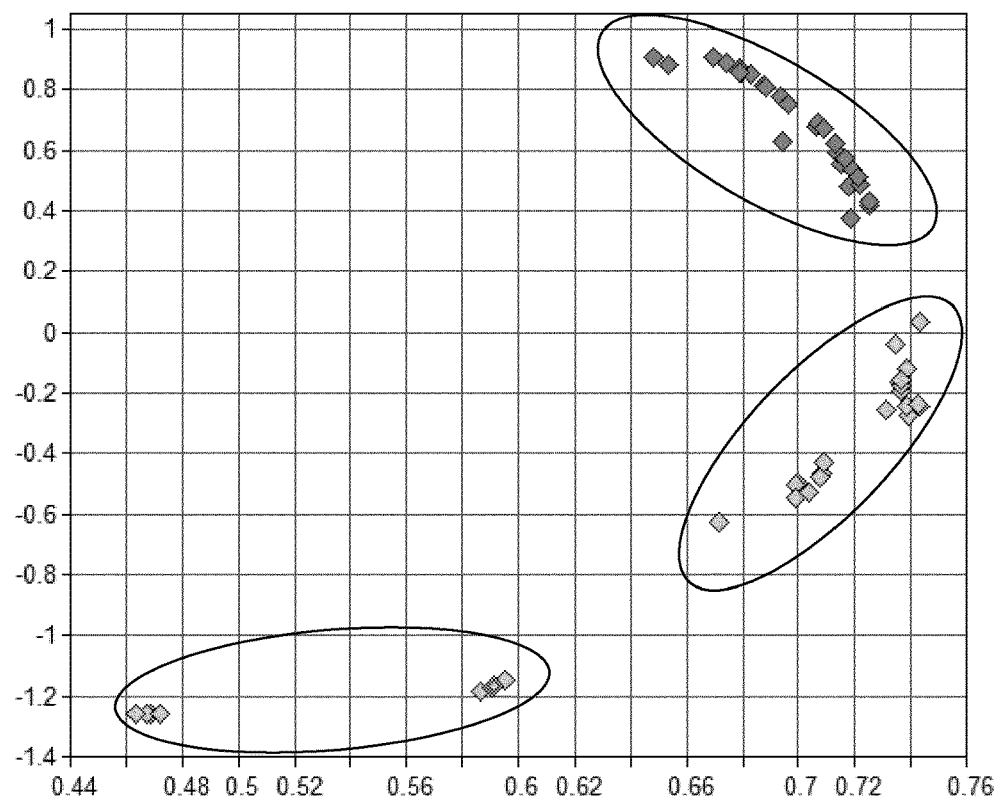
FIG. 6 shows the score diagram (score 2 vs. score 1) of the second PCA, carried out in the spectral regions from 1775 to 1625 cm$^{-1}$ and from 970 to 725 cm$^{-1}$.
Figure 7:
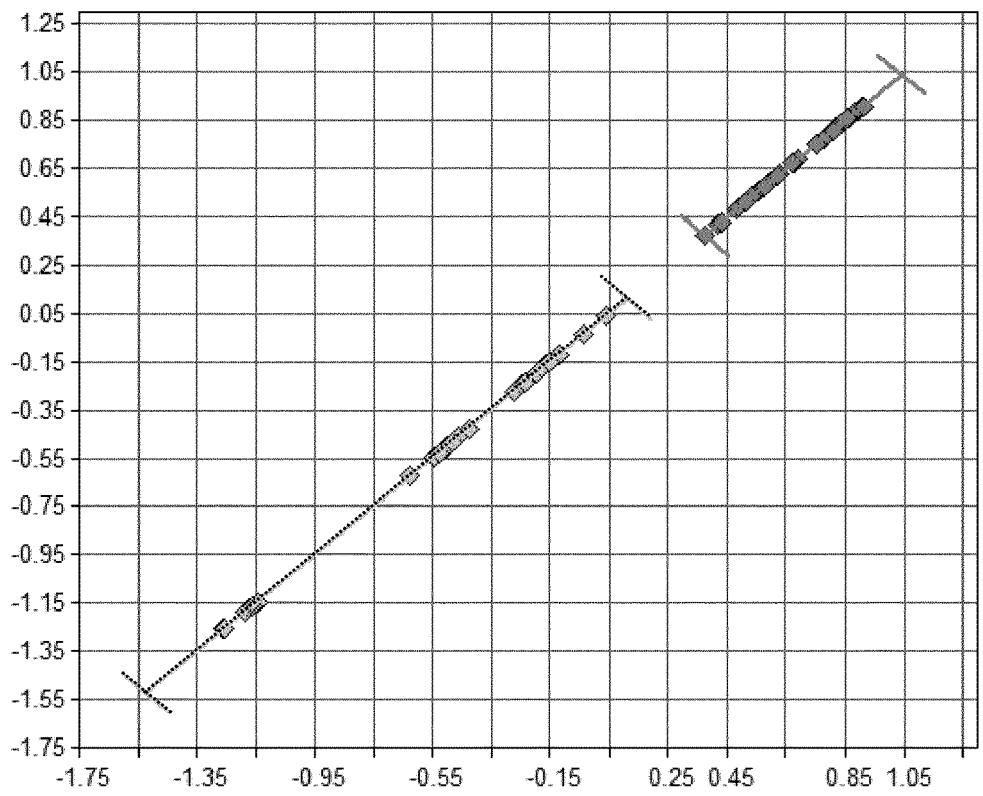
FIG. 7 shows the score diagram (score 2 vs. score 2) of the second PCA, carried out in the spectral regions from 1775 to 1625 cm$^{-1}$ and from 970 to 725 cm$^{-1}$.

A second sub-library was defined considering conventional and HR samples. Thus, a spectral pre-processing consisting of a combination of vector-normalization and first derivative (using a recommended derivatization window of 9 points) was performed. Then, a second PCA in the spectral regions from 1775 to 1625 cm$^{-1}$ and from 970 to 725 cm$^{-1}$ (FIG. 3) was carried out to define a second library. This allowed to distinguish conventional from HR polyurethane foams with one principal component (FIG. 6 and FIG. 7). The whole method was saved as identity method in the OPUS software.

Once the libraries were defined and registered, the identity method was easily run for unknown samples which were then sorted by the type of foam (conventional, HR or viscoelastic). When the matching with the library or sub-library was not correct, the software classified the sample as "unknown".

The sorting method was validated with known post-consumer samples and was confirmed that it was ready to scale up to an industrial process.

Example 2

In addition to the sorting of Example 1, the presence of CaCO$_3$ and TCPP was analyzed X-ray fluorescence (XRF). Measurement of the samples in the XRF equipment was carried out with an Ag anode X-ray tube, 50 kV and 1000 μA intensity.

Sample A1 was used as a blank for P, Cl and Ca; sample A3, with a content that should be detectable for Cl and P, was used as a reference for the presence of TCPP; and sample A4 was used as a reference for the detection of Ca should be detected. In addition, post-consumer foam samples, of unknown composition, were available and used to assist in equipment testing.

In order to determine the characteristics of the methods for CaCO$_3$ quantification and TCPP detection in polyurethane post-consumer foams, the foams of Table 2 with different amounts of CaCO$_3$ and TCPP were prepared and used as standards. Polyol A is Alcupol® F-4811, a non reactive triol 3,500 g/mol molecular weight, hydroxyl number 48 mg KOH/g, and viscosity (at 25° C.) 560 cP used in the production of conventional foams for the comfort market. Polyol B is Alcupol® X1550, a blend of different polyols especially designed for the production of viscoelastic foam TDI T-65 based, hydroxyl number 163 mg KOH/g and viscosity (at 25° C.) 300 cP.

TABLE 2

| Sample | Polyol A | CaCO$_3$ | TCPP | Polyol B |
|---|---|---|---|---|
| A | 100 | 0 | 0 | 0 |
| C | 100 | 5 | 0 | 0 |
| B | 100 | 10 | 0 | 0 |
| D | 100 | 15 | 0 | 0 |
| F | 100 | 0 | 10 | 0 |
| E | 100 | 0 | 15 | 0 |
| G | 100 | 0 | 20 | 0 |
| H | 100 | 10 | 15 | 0 |
| I | 0 | 10 | 0 | 100 |

CaCO$_3$, TCPP a calibration curve with the same polyol was obtained from samples A to G. Sample H allowed to assess the effect of CaCO$_3$ on the TCPP analysis, and sample I allowed to assess the effect of a different polyol (and therefore different foam) on the CaCO$_3$ quantification. Thus, by XRF, Ca will be analyzed for the quantification of CaCO$_3$, and P and Cl for the detection of TCPP.

Besides, Ca and P in the foams were quantitatively analyzed by Induction Coupled Plasma Atomic Emission Spectroscopy (ICP-AES). For this purpose, each foam was ground using a cryogenic mill cooled with liquid nitrogen. The resulting powder was digested by a microwave oven to remove organic matter and the aqueous solution was analyzed by ICP-AES and calibration with standards of known concentration. The concentrations and standard deviation (expressed in mg/kg) obtained are shown in Table 3.

TABLE 3

| Sample | Ca (average) | Ca (SD) | P (average) | P (SD) | No of replicates |
|---|---|---|---|---|---|
| A | 62 | 2 | 2 | 0 | 2 |
| C | 23810 | 2670 | 28 | 8 | 2 |
| B | 11820 | | 20 | | 1 |
| D | 34810 | 4070 | 32 | 11 | 2 |
| F | 69 | 25 | 5970 | 160 | 2 |
| E | 20 | | 8750 | | 1 |
| G | 125 | 70 | 10215 | 690 | 2 |
| H | 21900 | 1520 | 7030 | 480 | 2 |
| I | 24250 | 2640 | 27 | 20 | 2 |

For the quantification of Cl, the indirect method based on the P quantification data and the stoichiometric calculation of the TCPP molecule (3 atoms of Cl for each atom of P) was used. The results obtained with concentrations expressed in mg/kg are shown in Table 4.

TABLE 4

| Sample | Cl |
|---|---|
| F | 19803 |
| E | 27836 |
| G | 33207 |
| H | 24636 |

TCPP Detection and Post-Consumer Foam Analysis

The samples were analyzed by XRF by obtaining, in the same measurement, the signals of the three elements of interest, as well as a signal, called "Compton", which was used to correct possible matrix effects. The intensities obtained for the standard samples are shown in Table 5.

TABLE 5

| Sample | Ca | Cl | P | Compton |
|---|---|---|---|---|
| I | 84541.09 | 166.485 | −8.693 | 18443 |
| B | 62163.79 | 136.794 | −8.029 | 9082.061 |
| A | 550.621 | 128.791 | 0.591 | 9299.809 |
| C | 33164.07 | 133.202 | −7.394 | 8938.053 |
| D | 84855.1 | 136.98 | −12.669 | 8964.676 |
| F | 538.184 | 58729.75 | 3505.097 | 8986.592 |
| E | 535.088 | 84353.02 | 5156.336 | 9487.984 |
| G | 540.022 | 101755.4 | 6333.723 | 9745.886 |
| H | 44456.23 | 73380.1 | 4476.362 | 9278.216 |

Calibration lines for P and Cl were constructed with these intensities.

To determine the minimum concentration of TCPP that the system could detect, the limit of quantification, defined as 10 times the standard deviation of samples not containing the analyte, was used. Table 6 shows the limits of detection for each of these elements (P and Cl) and for TCPP.

TABLE 6

| Analyte | Detection limit | |
|---|---|---|
| | ppm analyte | ppm TCPP |
| P | 100 | 1000 |
| Cl | 100 | 300 |

With the calibration lines, several post-consumer samples were analyzed and the results (expressed in mg/kg) are shown in Table 7.

TABLE 7

| Sample | P | Cl | TCPP (P) | Cl/P |
|---|---|---|---|---|
| a1 | <100 | 623 | | |
| a3 | <100 | 411 | | |
| a5 | <100 | 237 | | |
| C1 | <100 | 210 | | |
| B2 | <100 | 263 | | |
| A4 | <100 | 496 | | |
| C6 | <100 | 265 | | |
| A7 thin | <100 | 151 | | |
| A18 hard | 126 | 804 | 1337 | 6.36 |
| A19 | <100 | 336 | | |
| B7 | 2914 | 10826 | 30802 | 3.72 |
| a6 porous | <100 | 177 | | |
| a6 porous | <100 | 308 | | |
| a10 not flat surface | <100 | 102 | | |
| a10 flatter, cleaner surface | <100 | 327 | | |
| a15 dark narrow surface | <100 | 266 | | |
| a15 clearer surface | <100 | <100 | | |
| a17 | <100 | <100 | | |
| b4 | <100 | 293 | | |
| a16 | <100 | 744 | | |
| a3 rep | <100 | 392 | | |

To confirm the presence of TCPP in a foam, a double criterion is established: detection of P above the detection limit, and the Cl/P concentration ratio obtained in the vicinity that should be close to 3.4 (3 atoms of Cl per atom of P, expressed in mass).

Ca Calibration and Post-Consumer Sample Analysis

With the intensities obtained from the Ca measurement in the standard sample foams (except for I, which will be used as a check) and the quantitatively analyzed concentration, a first calibration line for Ca was constructed.

This calibration line was used to calculate the concentration of test sample I, which was made with a different type of polyol and, therefore, corresponded to a different foam. The Ca concentration obtained was 34890 ppm, that compared to the analyzed concentration of 24250 ppm represented a difference of 44%. As expected, the typology of the foam, presenting a greater or lesser amount of "voids" in the mass analyzed by XRF, means that the intensities obtained between different types of foam cannot be comparable. In order to correct for this effect, a band appearing in the spectrum, known as "Compton", was used. By plotting ratios between the intensities of the analyte band and the Compton band, a second calibration line was obtained.

Analyzing the calibration sample I with this calibration line a concentration of 17212 ppm was obtained, which was 30% lower compared to a theoretical concentration of 24250 ppm.

The limit of quantification was expressed as 10 times the standard deviation of the standard samples without the presence of Ca. A limit of quantification of 200 mg/kg Ca was obtained, which corresponds to 500 mg/kg $CaCO_3$.

The results of the samples analyzed expressed in mg/kg are shown in Table 8.

TABLE 8

| Sample | Ca | CaCO3 |
|---|---|---|
| a1 | <200 | <500 |
| a3 | <200 | <500 |
| a5 | 35127 | 87731 |
| C1 | <200 | <500 |
| B2 | <200 | <500 |
| A4 | 33329 | 83240 |
| C6 | <200 | <500 |
| A7 thin | 24881 | 62140 |
| A18 hard | <200 | <500 |
| A19 | <200 | <500 |
| B7 | <200 | <500 |
| a6 porous | 23191 | 57918 |
| a6 porous | 14767 | 36881 |
| a10 not flat surface | <200 | <500 |
| a10 flatter, cleaner surface | 594 | 1483 |
| a15 dark narrow surface | 30305 | 75688 |
| a15 clearer surface | 29713 | 74209 |
| a17 | <200 | <500 |
| b4 | <200 | <500 |
| a16 | 32096 | 80161 |
| a3 rep | <200 | <500 |

CITED REFERENCES

1. Reference Manual—OPUS Spectroscopic Software Version 7.5 from Bruker Optik GmbH 2014.

What is claimed is:

1. A method for sorting flexible polyurethane foams comprising:
   a) providing two or more calibration samples of conventional flexible polyurethane foams, two or more calibration samples of high resilience (HR) flexible polyurethane foams, and two or more calibration samples of viscoelastic flexible polyurethane foams, and obtaining a mid-infrared (MIR) spectrum of each calibration sample, wherein the MIR is defined by a whole spectral region from 4000-400 $cm^{-1}$;
   b) carrying out a spectral pre-processing of the spectra of all the calibration samples, and then a first principal component analysis (PCA) in the spectral region from 1800 to 1425 $cm^{-1}$ to define a first library that allows distinguishing viscoelastic polyurethane foams;
   c) carrying out a spectral pre-processing of the infrared spectra of conventional and HR polyurethane foam calibration samples, and then a second PCA in the spectral regions from 1775 to 1625 $cm^{-1}$ and from 970 to 725 $cm^{-1}$ to define a second library that allows distinguishing conventional from HR polyurethane foams with one principal component;
   d) obtaining the MIR spectrum of a sample of polyurethane foam and, based on the first and second libraries, classifying the sample of polyurethane foam as a conventional, a HR or a viscoelastic polyurethane foam, or as a foam that is neither a conventional, a HR or a viscoelastic polyurethane foam.

2. The method of claim 1, wherein the two or more calibration samples of each flexible polyurethane foams is independently selected from 5 to 50.

3. The method of claim 2, wherein the two or more calibration samples of each flexible polyurethane foams is independently selected from 5 to 30, or from 5 to 20, or from 5 to 10.

4. The method of claim 1, wherein spectral pre-processing is carried out by a method selected from vector-normalization, first derivative, or a combination thereof.

5. The method of claim 1, wherein spectral pre-processing in step a) is carried out by vector-normalization.

6. The method of claim 1, wherein spectral pre-processing in step b) is carried out by vector-normalization and first derivative.

7. The method of claim 6, wherein the first derivative is carried out with a smoothing from 7 to 11 points.

8. The method of claim 6, wherein the first derivative is carried out with a smoothing from 7 to 9 points.

9. The method of claim 1, further comprising a step of determining the amount of P by a spectrometric method and if the amount of P is higher than 100 ppm, discarding the polyurethane foam for chemical recycling.

10. The method of claim 9, further comprising determining the presence of Cl by a spectrometric method and if the relation of Cl/P is at least about 3.4 by weight, discarding the polyurethane foam for chemical recycling.

11. The method of claim 9, wherein the spectrometric method is X-ray fluorescence as disclosed in the description.

12. The method of claim 1, further comprising a step of analyzing the amount of Ca by a spectrometric method and, if the amount of Ca is higher than 200 ppm, discarding the polyurethane foam for chemical recycling.

13. The method of claim 12, wherein the spectrometric method is X-ray fluorescence as disclosed in the description.

14. The method of claim 1, wherein the steps of analyzing the amount of Ca, P, Cl, or a combination thereof, are carried out before carrying out step a.

15. The method of claim 1, wherein the steps of analyzing the amount of Ca, P, Cl, or a combination thereof, are carried out after step d) and provided the polyurethane foam is a conventional one.

16. The method of claim 1, wherein spectral pre-processing in step a) is carried out by vector-normalization and spectral pre-processing in step b) is carried out by vector-normalization and first derivative.

17. The method of claim 16, wherein the first derivative is carried out with a smoothing from 7 to 11 points.

18. The method of claim 17, further comprising a step of determining the amount of P by a spectrometric method and if the amount of P is higher than 100 ppm, discarding the polyurethane foam for chemical recycling.

19. The method of claim 18, further comprising determining the presence of Cl by a spectrometric method and if the relation of Cl/P is at least about 3.4 by weight, discarding the polyurethane foam for chemical recycling.

20. The method of claim 19, further comprising a step of analyzing the amount of Ca by a spectrometric method and, if the amount of Ca is higher than 200 ppm, discarding the polyurethane foam for chemical recycling.

* * * * *